June 18, 1968  B. J. ROSENTHAL  3,388,623
FILM-LIKE SHEET MATERIAL FEEDING AND CUTTING DEVICE
Filed Aug. 29, 1966

INVENTOR
BEN J. ROSENTHAL
BY
Mueller, Aichele & Rauner ATTORNEYS.

United States Patent Office 3,388,623
Patented June 18, 1968

3,388,623
FILM-LIKE SHEET MATERIAL FEEDING AND CUTTING DEVICE
Ben J. Rosenthal, Skokie, Ill., assignor to Harry Rosenthal, Chicago, Ill.
Filed Aug. 29, 1966, Ser. No. 575,767
10 Claims. (Cl. 83—98)

This invention pertains to a machine for feeding and cutting film-like material.

Machines have been provided for cutting film-like material such as polyethylene by use of a heated wire. Such a machine is described and claimed in Patent No. 3,177,-748. In such machines the material may be raised to engage the cutting wire, making it desirable that the uncut portion be returned to a supporting table or conveyor to prevent tangling prior to the next cutting cycle. In many instances the actuating apparatus and device for returning the material to the conveyor is complicated and costly.

It is an object of this invention to provide an improved machine for feeding and cutting film-like material.

Another object of this invention is to provide a machine for feeding and cutting film-like material that utilizes a simplified and inexpensive actuating apparatus and device for returning the film-like material to the conveyor subsequent to the cutting cycle.

A feature of this invention is a machine for feeding and cutting film-like material having a roller that is coupled to a lifter which raises the film-like material from the conveyor belt into engagement with a cutting wire to sever the same. The roller raises with the lifter to permit the material to be raised from the conveyor and subsequently engages the free end of the uncut portion of the film material from which a portion is cut to return the uncut portion to the conveyor.

Another feature of this invention is the machine for feeding and cutting film-like material having a clamping device for clamping the material to the conveyor when the lifter raises the material into engagement with the cutting wire, a first cam actuated linkage coupled to the lifter and roller to impart motion thereto, and a second cam actuated linkage coupled to the clamping device to impart motion thereto, so that the clamping device will engage and clamp the material while the lifter raises the material into engagement with the cutting wire to cut the material. Subsequently the roller engages the free end of the material from which a portion is cut to return the same to the conveyor.

The machine of the invention includes a conveyor belt which frictionally draws a sheet of film-like material, such as polyethylene film, from a storage roll to a work area. A timer controls the amount of material fed by the conveyor. When the preselected length is reached, the cam is rotated which actuates a first linkage to move a device to clamp the material against the conveyor at one point. The cam also moves a second linkage which is coupled to a lifting device which raises the material off the conveyor at another point bringing the material into contact with a heated wire which acts to cut it. A roller is coupled to the lifting device and during the feeding cycle of the machine, the roller presses the film-like material against the conveyor. When the lifting device is raised by the action of the cam, the roller breaks engagement with the material and is elevated with the lifting device. After the material is cut, the cam lowers the lifting device, and the roller moves with it into engagement with the free end of the material from which portion is cut to return the same into engagement with the conveyor prior to the next feeding cycle.

Figure 1:
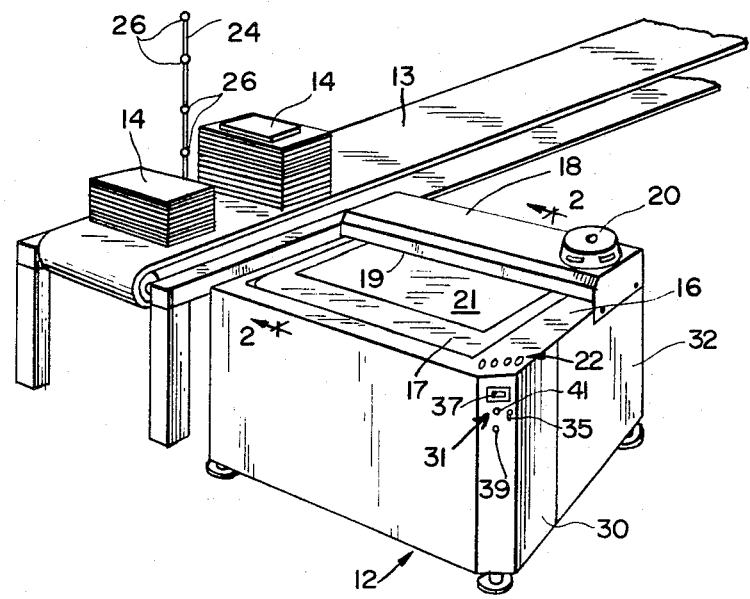
FIG. 1 is a perspective view of the machine of the invention.

Referring in more detail to the accompanying drawing, FIG. 1 illustrates a pushbutton controlled sheet material feeding machine 12 in accordance with this invention. The machine illustrated is similar in many respects to the machine described and claimed in the aforesaid Patent No. 3,177,748.

The machine 12 may be positioned for use near the end of the belt conveyor 13 on which bundles 14 of laundry or the like are placed prior to being wrapped. The machine 12 has a flat wrapping table 16 which is substantially on the same level as conveyor 13. Most of the surface of the table is covered by an endless conveyor belt 17 which travels from under a roll cover 18 at the rear of the table and enters the table at the front through a slotted portion 19. A severing mechanism, described subsequently in detail, is concealed within roll cover 18, and polyethylene or other plastic film 21 is fed underneath roll cover 18 and on to the table 16 by means of the conveyor belt 17. An air intake and filter 20 for a blower is mounted on top of the roll cover 18. Conveyor belt 17 is made of a material to which film 21 will adhere sufficiently to permit the belt to draw the film from its supply roll.

The operator controls the amount of film which is fed and severed by means of pushbuttons 22 located near the right front edge of the wrapping table 16. In order to enable the operator to gauge rapidly the amount of sheet material which is required, there is provided near the conveyor 13 a standard 24 on which are mounted various indicies 26 in vertically spaced relation. The indicies 26 and the buttons 22 have corresponding colors to aid the operator in selecting a proper button. The machine thereupon feeds the appropriate amount of plastic material onto the wrapping table 16 and severs this length of material. The operator then lifts the bundle of laundry 14 onto the severed piece of plastic and wraps the bundle in this plastic material.

The lower part of the machine 12, below the wrapping table 16, is enclosed by a housing 30. On the right hand side of the machine, as viewed in FIG. 1, there is a control panel 31 which includes the main power switch 35, a counter 37, a manual feed switch 39 and a manual cut switch 41. A removable panel 32 is provided behind which are disposed most of the operative mechanisms of the machine. The severing mechanism of the machine is actuated by an electric motor (not shown) turning a pair of concentric cams 40 on opposite sides of the machine. Only the cam on one side is shown, and in the following description reference will be made to mechanisms which appear on both sides of the machine, with only one side shown. Cam followers 42 translate the rotating motion of the cams 40 into vertical motion. The cam followers 42 are used to drive two separate linkages. The first linkage is formed by adjustable arms 44 that are pivotally connected at 46 to the cam followers 42 and at 48 to the lifter support brackets 50. Coupled between the lifter support brackets 50 is a lifter bar 52. Arms 54 are pivotally connected to the lifter support brackets 50 and to a roller 56 which is located intermediate the lifter 52 and clamping bar 62.

The second linkage includes arms 58 which are pivoted about fixed point 59 and pivotally connected to the riser bars 60 which form part of the clamping mechanism. The riser bars 60 are pivotally mounted to the arm 58 and form part of the hold-down or clamping device. An elongated hold-down or clamping bar 62, provided with holes near the end thereof, is received on the reduced upper ends of the bars 60 so that it rests on shoulders 64. Compression springs 66 have one face resting against the hold-down bar 62 and the other face abutting against fixed sleeve 68, and serve to bias the hold-down bar 62 firmly against the shoulder 64. Rods 70 are pivotally connected to the hold-down bar 62 and plate 72 to keep the hold-down bar upright. Hold-down bar 62 thus spans the endless belt 17 and moves vertically with the rotation of cam 40. A clamping member 74 preferably formed of sponge rubber, is affixed to the underside of hold-down bar 62 for engaging and pressing the sheet material 21 against the endless belt 17 when the hold-down bar is in its lower position. Hold-down bar 62 also supports brackets 76 which are mounted to the rear side of the hold-down bar by means of bolts 78 and which have arm portions 80 extending rearwardly and downwardly therefrom. The outer ends of the arm portions 80 support collars 82 which are adopted to hold a nichrome severing wire 84 therebetween. The wire is energized from a relay and upon heating expands to operate a switch to open the relay thereby preventing the wire from overheating.

The drive for the conveyor 17 and the plastic film 21 includes a hold-down roller 86 which presses the plastic film 21 against the top of a feed roller 88. The roller 86 is rotatably mounted on a shaft 87 which is fixed at its ends to a pair of pivotally mounted arms 89. A handle bar 91 is supported by the free end of the arms 89 and spans the distance therebetween and tends to weigh down the roller 86 such that it makes light contact with the feed roller 88. The handle bar 91 also provides a convenient means for raising the roller 86 so that the end of the plastic film may be inserted between the rollers 86 and 88. A second feed roller 93 is rotatably mounted on a shaft 95 and is located on the side of the conveyor belt 17 which is opposite to the side which roller 56 engages. The roller 93 is located beneath the roller 56 so that in the lowered position, roller 56 presses down on roller 93 compressing therebetween the film-like material 21 and the conveyor belt 17. The rollers 56 and 93 provide the primary feed drive for the machine 12.

A blower 100 is mounted in the roll cover 18. The blower may be of standard construction and operated by an electric motor. An air intake filter 20 is mounted on top of the blower 100. A duct 101 extends from the blower output the length of the roll cover 18. Mounted in the duct 101 at the end of the roll cover opposite the blower end is a variable shutter 103. The variable shutter regulates the flow of air in the duct by regulating the amount of back pressure on the blower output. The duct 101 includes a vent 105 which runs along the length of the duct. The vent, therefore, spans the endless belt 17. The vent 105 includes a lip 107 for directing the stream of air flowing out of the vent as indicated by the arrows. The blower is connected so that it operates at all times when the machine 12 is energized.

Figure 2:
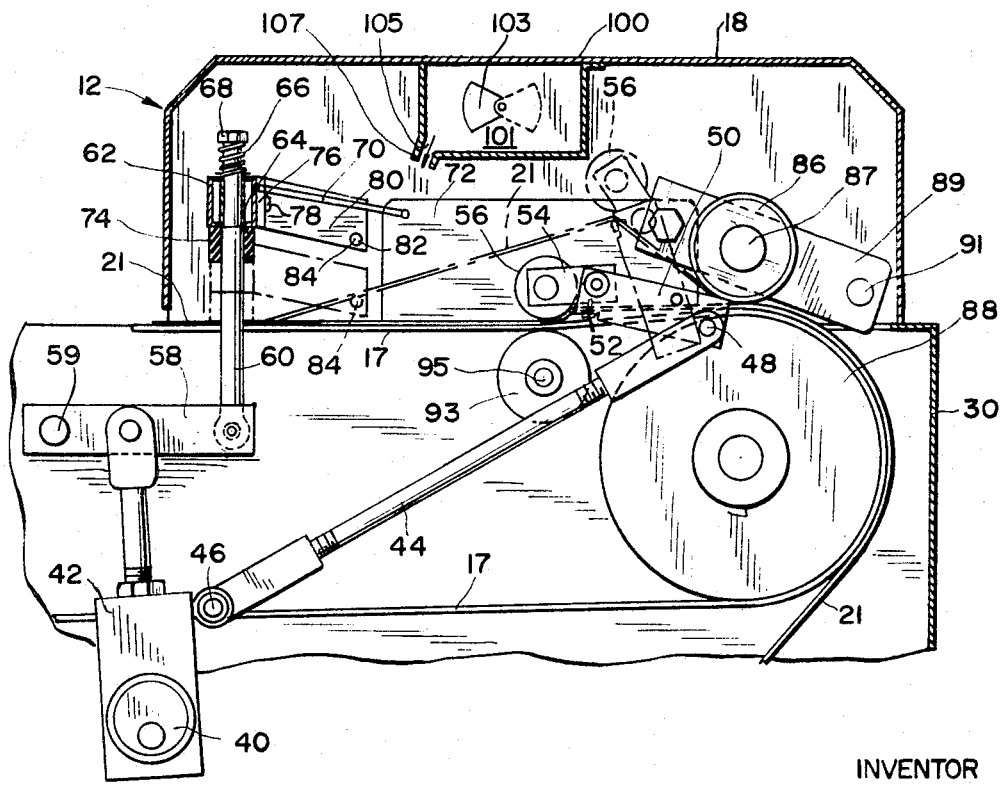
FIG. 2 is a sectional side elevation taken generally along the lines 2—2 of FIG. 1 with the cutting cycle shown in phantom.

In operation, the desired amount of plastic film 21 is advanced onto the table 16 in front of the operator, and then cut in accordance with the length selected by operating the appropriate pushbutton 22. During the feeding portion of the cycle, the various elements of the severing mechanism are in the position shown in solid lines in FIG. 2. At the appropriate time, the feeding of the plastic web 21 is arrested, and a motor (not shown) is energized to cause the concentric cams 40 to rotate initiating the cutting part of the cycle which is shown in dotted lines in FIG. 2. This causes downward movement of the cam follower 42 causing the arms 58 to pivot about fixed pivot 59. When the forward part of the arms 58 pivot downward, downward vertical movement of the bars 60 follows to move the hold-down bar 62, hence the clamping member 74, into firm engagement with the plastic film 21, pressing it against the belt 17.

Simultaneously, as the clamping bar 62 is moved into position, the adjustable arms 44 are moved by the cam followers 42. The movement of the arms 44 rotate the lifter support bracket 50 about pivot 48 to raise the lifter support bracket. As the lifter support bracket is raised, the arms 54 supporting the roller 56 pivot about the lifter bracket until the roller engages the lifter bar 52. At this point the roller can no longer pivot about the lifter support bracket, and it is raised with the bracket 50 to the position shown in phantom in FIG. 2. When the roller 56 is removed from engagement with the film 21, the lifter bar is free to elevate the film 21 until it engages the cutting wire 84. Current is applied to the wire and the heat tends to melt the plastic to sever the material. Continued movement of the cams 44 cause the clamping bar 74 to be raised and the lifter support bracket 50, lifter rod 52 and roller 56 to be lowered. The roller 56 as it is being returned to the conveyor 17 engages the free end of the uncut portion of the film material from which a portion is cut to return the film material into engagement with the conveyor 17. The compressive force between the roller 56 and feed roller 93 eliminates the possibility that the free end of the uncut portion could sneak back behind the feed roller 56 to become tangled in the machine.

When the plastic 21 melts, there is a tendency for the cut ends of the material to remain stuck to the wire 84. This is especially true of that portion of the film material 21 which is severed from the supply roll, to be used for wrapping the bundle. The stream of air is directed by the lip 107 from a point above the belt 17 downward to the point where the wire 84 severs the film material 21. The stream of air functions to blow the severed ends of the material 21 clear of the wire 84 to prevent tangling of the next cutting cycle caused by the cut edges remaining stuck to the wire. The air stream also aids the roller 56 in returning the unsevered portion of the material 21 back into frictional engagement with the belt 17. In addition, the air stream causes the cut edge of the material 21, severed from the supply roll, either to be blown back upon the severed material, or to leave an air pocket between the material and endless belt 17. This breaks the frictional contact between the belt and the material to provide an edge which an operator can grasp so that valuable time is not used in peeling the material 21 from the belt 17.

The invention, therefore, provides an improved machine for feeding and cutting film-like material that utilizes a simplified and inexpensive actuating apparatus and device for returning the free end of the portion of the film material from which a portion is cut to the conveyor belt.

I claim:

1. In a machine for automatically feeding and cutting film-like material which has conveyor means adapted to support and draw the material, raising means for lifting the material from the conveyor means, and a cutting wire which is engageable with the raised material for cutting the same, the combination including, actuating means for moving the raising means to lift the material from the conveyor into engagement with the cutting wire, and means for returning to the conveyor means the portion of the film material from which a portion is cut, said means including a roller spaced intermediate the raising means and cutting wire and engaging the film material to press the same onto said conveyor means, said roller being coupled to and moved by said actuating means from engagement with the film, with the raising means lifting the film material from the conveyor means into engagement with the cutting wire, and said actuating means moving said roller into engagement with the film material to return to the conveyor means the portion of the film material from which a portion is cut.

2. The machine for automatically feeding and cutting film-like material of claim 1 further including a feed roller rotatably mounted to the machine on the side of the conveyor means opposite the side to which said roller returns the film-like material and beneath the same, said roller and said feed roller compressing therebetween the film-like material and conveyor means thereby cooperating to provide a feed drive for the conveyor means and material and to prevent the free end of the portion of the film material from which a portion is cut from becoming tangled in the machine.

3. The machine for automatically feeding and cutting film-like material of claim 1 wherein the raising means includes a pivotally mounted lifter support bracket, and wherein said means for returning to the conveyor means the portion of film material from which a portion is cut includes an arm pivotally connecting said roller to the lifter support bracket, said actuating means being connected to the lifter support bracket and pivoting the same to raise the film material and said roller from the conveyor means to engage the film material with the cutting wire to cut the same, said actuating means lowering the lifter support bracket and roller into engagement with the film material to return to the conveyor means the portion of the film material from which a portion is cut.

4. The machine for automatically feeding and cutting film-like material of claim 3 wherein said actuating means includes a rotatable cam member, and linking means coupled between said cam member and said lifter support bracket, said cam member being rotated to move said linking means to pivot said lifter support bracket to raise and lower said roller and the film material with respect to the conveyor means.

5. A machine for automatically feeding and cutting film-like material including in combination, conveyor means adapted to support and draw the material, clamping means movable to engage said conveyor means and clamp the material thereagainst, movable lifting means spaced from said clamping means and engaging the material for lifting the same off said conveyor means, a cutting wire being positioned to engage the material to cut the same with said clamping means in engagement with the material and said lifting means being moved to raise the material off said conveyor means, roller means coupled to said lifting means and movable therewith, said roller means engaging the film material and pressing the same onto said conveyor means, and actuating means for moving said clamping means, said lifting means and said roller means, so that said clamping means engages the material to clamp the same, with said roller means being moved from engagement with the film-like material, and with said lifting means raising the material into engagement with said cutting wire, and said actuating means raising said clamping means and moving said roller means into engagement with the free end of the film material to return to the conveyor means the portion of the film material from which a portion is cut.

6. The machine for automatically feeding and cutting film-like material of claim 5 further including a feed roller rotatably mounted to the machine on the side of the conveyor means opposite the side to which said roller means returns the film-like material and beneath the same, said roller means and said feed roller compressing therebetween the film-like material and conveyor means thereby cooperating to provide a feed drive for the conveyor means and material and to prevent the free end of the portion of the film material from which a portion is cut from becoming tangled in the machine.

7. The machine for automatically feeding and cutting film-like material of claim 5 further including blower means mounted to the machine, said blower means directing a stream of air from a point above said conveyor means downward to the point where said cutting wire engages the material so that the stream of air blows the cut film material clear of said cutting wire and cooperates with said roller means to return to said conveyor means the free end of the film material from which a portion is cut.

8. The machine for automatically feeding and cutting film-like material of claim 5 wherein said lifting means includes a pivotally mounted lifter support bracket, and said roller means includes arm means pivotally connecting said roller means to said lifter support bracket, and wherein said actuating means is pivotally connected to said lifter support bracket, so that movement of said actuating means pivots said lifting means to raise the film-like material off said conveyor means and causes said arm means to pivot about said lifter support bracket with said roller means engaging said lifting means whereupon said roller means raises with said lifting means to break the engagement between said roller means and the material, and further movement of said actuating means raises said clamping means and lowers said lifting means until said roller means engages the free end of the film-like material and returns to the conveyor means the portion of the film material from which a portion is cut.

9. The machine for automatically feeding and cutting film-like material of claim 8 wherein said actuating means includes a rotatable cam member and first and second linking means coupled to said cam member, said first linking means coupling said rotatable cam member to said clamping means to impart motion thereto, and said second linking means coupling said rotatable cam member to said lifting means and said roller means to impart motion thereto, so that said clamping means will engage and clamp the film-like material with said lifting means raising the film-like material off said conveyor means and causing said arm means to pivot about said lifter support bracket with said roller means engaging said lifting means whereupon said roller means raises with said lifting means to break the engagement between said roller means and the material, and further movement of said actuating means raises said clamping means and lowers said lifting means until said roller means engages the free end of the film-like material and returns to the conveyor means the portion of the film material from which a portion is cut.

10. A machine for automatically feeding and cutting film-like material including in combination, conveyor means adapted to support and draw the material, clamping means movable to engage said conveyor means and clamp the material thereagainst, movable lifting means spaced from said clamping means and engaging the material for lifting the same off said conveyor means, a cutting wire being positioned to engage the material to cut the same with said clamping means in engagement with the material and said lifting means being moved to raise the material off said conveyor means, means engageable with said conveyor means to return the free end of the film material from which a portion is cut into contact with said conveyor means, and actuating means including first cam actuated linkage means coupled to said lifting means and said means engageable with said conveyor means to impart motion thereto, and second cam actuated linkage means coupled to said clamping means to impart motion thereto, so that said clamping means will engage and clamp the material while said lifting means raises the material into engagement with said cutting wire to cut the material, and said means engageable with said conveyor means engages the free end of the material from which a portion is cut to return the same to said conveyor means.

References Cited

UNITED STATES PATENTS

| 3,053,128 | 9/1962 | Manthey | 83—171 X |
| 3,131,278 | 4/1964 | Rosenthal | 83—171 X |
| 3,134,005 | 5/1964 | Mayhew | 83—171 |
| 3,177,748 | 4/1965 | Rosenthal | 83—171 |
| 3,299,756 | 1/1967 | Rosenthal | 83—98 |

WILLIAM S. LAWSON, *Primary Examiner.*